(12) United States Patent  
Karapetian, Jr.

(10) Patent No.: US 8,622,453 B1  
(45) Date of Patent: Jan. 7, 2014

(54) FOOD SERVICE UNIT WITH DRIVE THROUGH CAPABILITIES

(76) Inventor: Vahe Nick Karapetian, Jr., Sherman Oaks, CA (US)

( * ) Notice: Subject to any disclaimer, the term of this patent is extended or adjusted under 35 U.S.C. 154(b) by 145 days.

(21) Appl. No.: 13/437,810

(22) Filed: Apr. 2, 2012

Related U.S. Application Data

(60) Provisional application No. 61/570,643, filed on Dec. 14, 2011.

(51) Int. Cl.
*B60P 3/025* (2006.01)

(52) U.S. Cl.
USPC ............................................. 296/22; 296/24.36

(58) Field of Classification Search
USPC ........................................... 296/21, 24.36, 25, 22
See application file for complete search history.

(56) References Cited

U.S. PATENT DOCUMENTS

| | | | | |
|---|---|---|---|---|
| 5,921,036 A | * | 7/1999 | Murphy | 52/169.1 |
| 5,938,261 A | * | 8/1999 | Faba | 296/22 |
| 8,157,136 B2 | * | 4/2012 | Lamb et al. | 222/608 |
| 2003/0225622 A1 | * | 12/2003 | Doan | 705/15 |

* cited by examiner

*Primary Examiner* — Dennis Pedder
(74) *Attorney, Agent, or Firm* — Kleinberg & Lerler, LLP; Marvin H. Kleinberg; Marshall A. Lerner

(57) ABSTRACT

A vehicle useful for catering, vending and food service normally has service windows on the passenger side of the vehicle to accommodate pedestrian patrons. Disclosed herein is such a vehicle fitted with an auxiliary service window on the driver's side of the vehicle to accommodate vehicular occupants. An auxiliary service platform is installed below interior floor level to place a server in closer proximity to an adjacent vehicle. Steps are provided to enable access to the auxiliary platform from the interior vehicle floor.

9 Claims, 5 Drawing Sheets

FOOD SERVICE UNIT WITH DRIVE THROUGH CAPABILITIES

BACKGROUND OF THE INVENTION

The present invention relates to mobile catering/vending/ food service/ facilities and, more particularly, to a catering/ vending/food service/vehicle/unit with a drive through vending capability.

General Background and State of the Art

In the United States of America, most mobile food service or mobile catering/vending/food service units have their customer accessible windows on the "passenger" or right side of the vehicle/unit only. When parked, most serving windows swing outward and upward, creating a temporary canopy for customers. Most units park on a street with traffic and serve walk-up only patrons on the sidewalks or at least the land adjacent the street. Increasingly, special lots are set aside for the use of mobile catering/vending/food service vehicles/ units, such lots acting as food courts.

These vehicle/units are designed to serve a pedestrian customer base walking up to the mobile unit and placing orders as if one walked into a restaurant; hence leaving an untapped potential source of customers who are in their vehicles and do not wish to leave to order food. Most, if not all, fast food establishments provide a drive through capability to accommodate customers in vehicles. Accordingly, there is a need for a mobile catering/vending /food service vehicle/unit that can serve both pedestrians and vehicle occupants, as well.

INVENTION SUMMARY

To maximize business opportunities, a mobile vehicle/unit can be provided with a "drive thru" window on the driver's side to provide "drive through" service. Where possible and if not a pedestrian hazard, a "drive thru" window can be placed on the passenger's side. This mobile vehicle/unit interior is modified to provide a platform that places the server at or near eye level of the patron in an automobile. To minimize traffic hazards, the serving window can slide open rather than creating a potential problem by swinging outward and/or upward as do the walk-up windows.

In operation, the mobile catering/vending/food service vehicle/unit serves its pedestrian patrons from the passenger or curbside of the vehicle/unit while motorists can approach the vehicle/unit from the driver's side and be served from a window on that side that can be somewhat closer to the patron's window. In some cases, the mobile vehicle/unit can also have both sides acting as the "drive thru" window to maximize "to-go" customers from their personal vehicles if not on a busy thoroughfare.

In one embodiment, a movable platform with integral steps is lowered from the interior floor of the vehicle/unit, placing the server closer to the motorist. In other embodiments, a permanent lower platform is built into the chassis. A menu station can be established at an end of the vehicle/unit so that motorist's orders can be placed before the service window is reached, much in the fashion of fast food restaurants with drive through windows.

In those locations where it is safe, pedestrian and vehicles can also approach from the front of the vehicle/unit, placing the driver adjacent the service window. Further, applications can be developed for hand held devices that can permit ordering in advance of arrival at the service window to supplement the touch screen menu displays which enable order placement.

In those areas which are similar to food courts and only open to pedestrian patrons, the "drive thru" service window can be an additional place from which patrons can be served. This would be most useful at times when patrons are pressed for time and large numbers of walk-up patrons are seeking service.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DETAILED DESCRIPTION OF THE PREFERRED EMBODIMENTS

Figure 1:
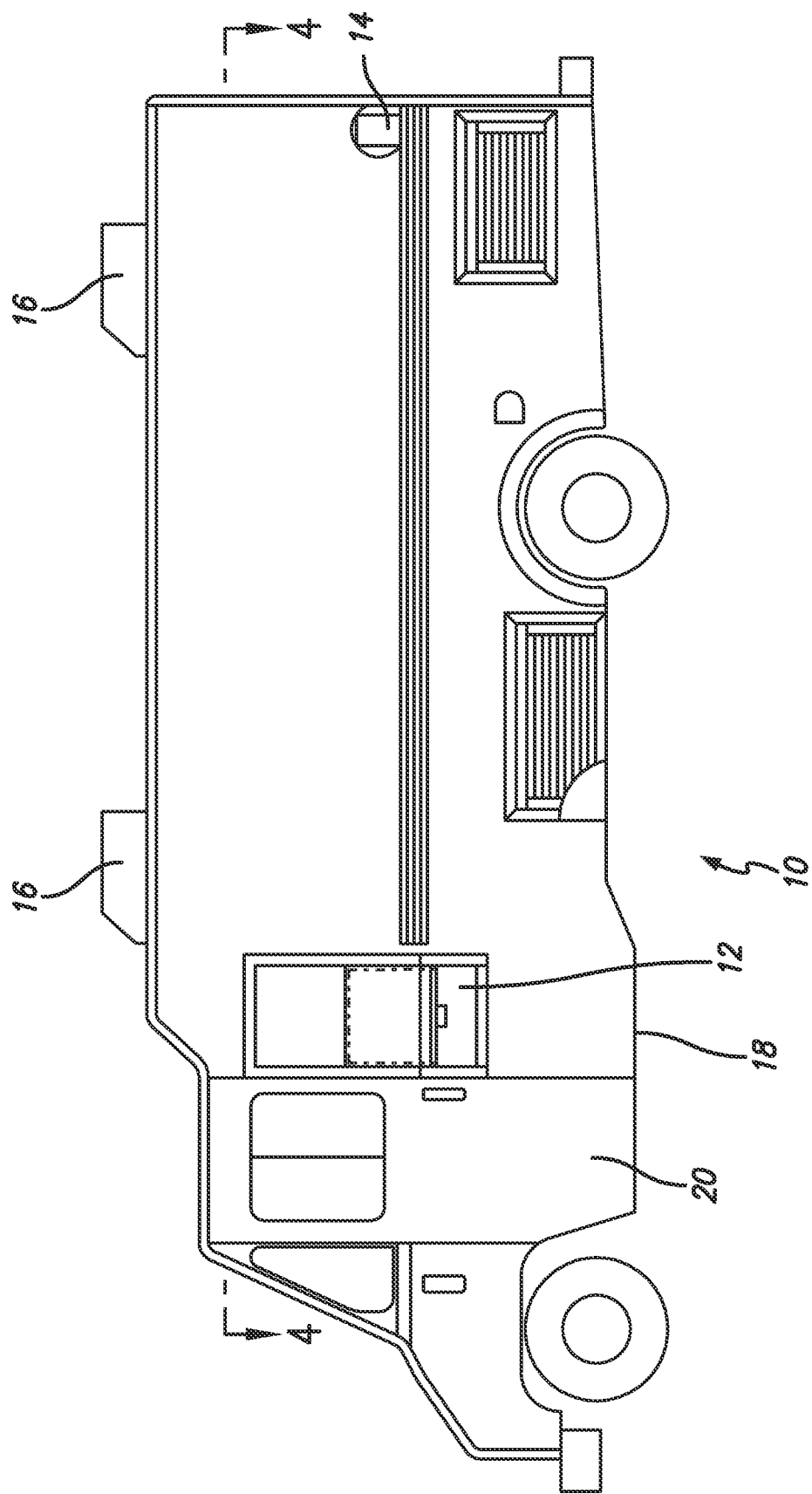
FIG. 1 is a side view of the driver's side of a mobile catering/vending/food service vehicle/unit showing the "drive thru" window.

Turning first to FIG. 1, there is shown a mobile catering/ vending/food service vehicle/unit 10 with a "drive thru" window 12 according to the present invention. In alternative embodiments, the window 12 can be an outward or upward swinging window where such an arrangement does not result in a traffic hazard, or, alternatively, the mobile vehicle/unit 10 of the present invention can provide a sliding window which presents no hazards to pedestrians or vehicles. The view is of the driver's or traffic side of the vehicle/unit 10 so that primary service is provided from the opposite side to a predominantly pedestrian patron.

A microphone/speaker combination 14 is provided at the rear of the mobile vehicle/unit 10 to allow motorists to deliver their orders before reaching the drive through window 12. Vents 16 are provided on the roof of the mobile vehicle/unit 10 to enable better air circulation in the mobile vehicle/unit 10 when parked and servicing customers.

The undersurface 18 of the mobile vehicle/unit 10 is lowered in the area of the "drive thru" window 12 and the driver's door 20 to allow for easier access to vehicles or pedestrians. This will allow the customer in a vehicle to communicate and exchange currency. It also permits a server at the "drive thru" window 12 of the mobile food unit 10 to service the customer. In alternative embodiments, the undersurface 18 could be at a uniform height to assure adequate ground clearance and a platform could be deployed downward when the mobile vehicle/unit 10 is at rest and serving customers.

Figure 2:
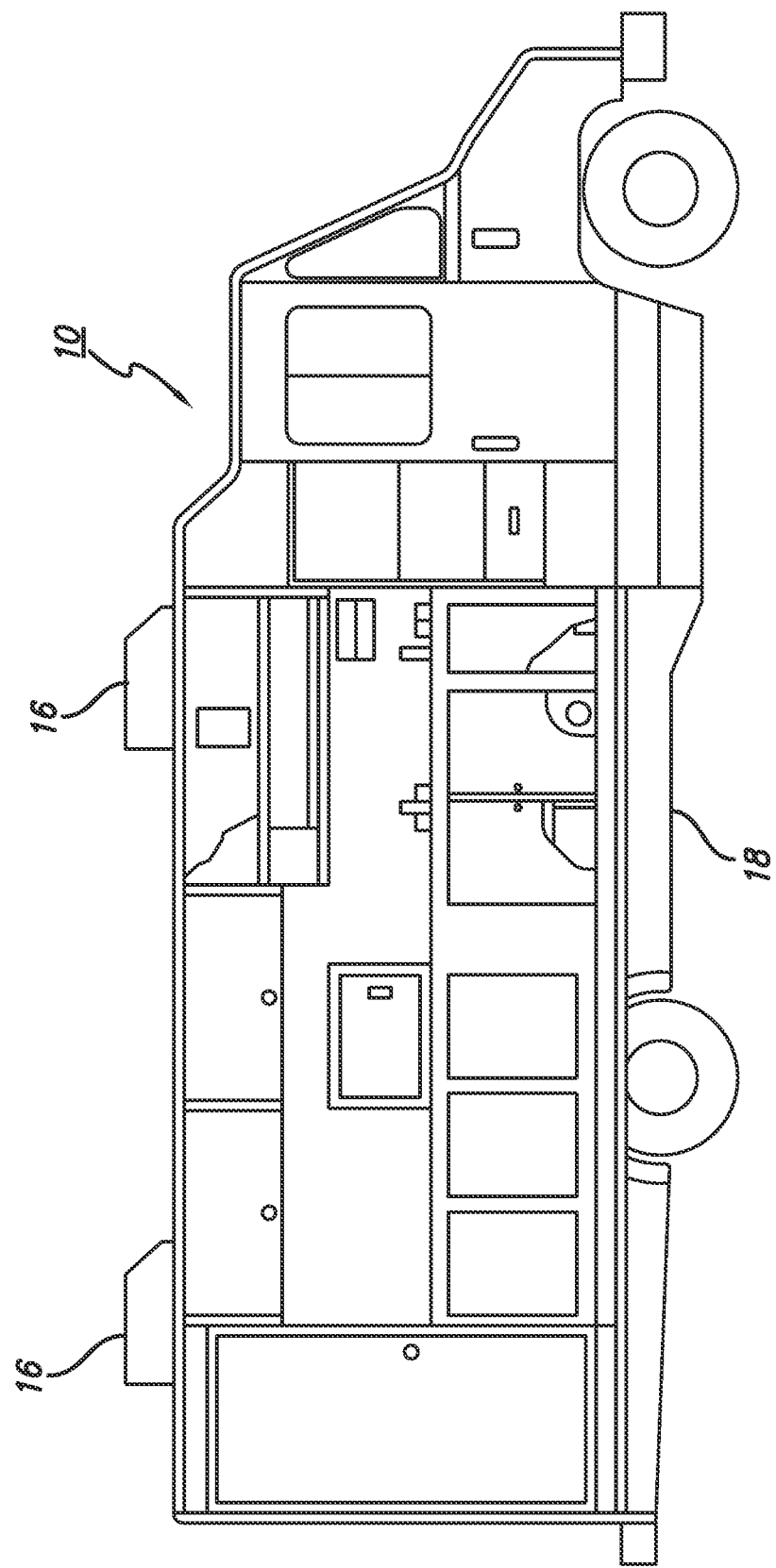
FIG. 2 is an opposite side view of the mobile catering/ vending/food service vehicle/unit of FIG. 1, showing the passenger side.

Turning next to FIG. 2, there is shown an interior view of the driver's side of the mobile vehicle/unit 10, showing some of the various cupboards, appliances and working areas normally found in a conventional mobile catering/vending/food service vehicle/unit and generally irrelevant to the present invention except that the present invention contemplates that a complete mobile catering/vending/food service vehicle/unit is equipped with a "drive thru" capability.

Figure 3:
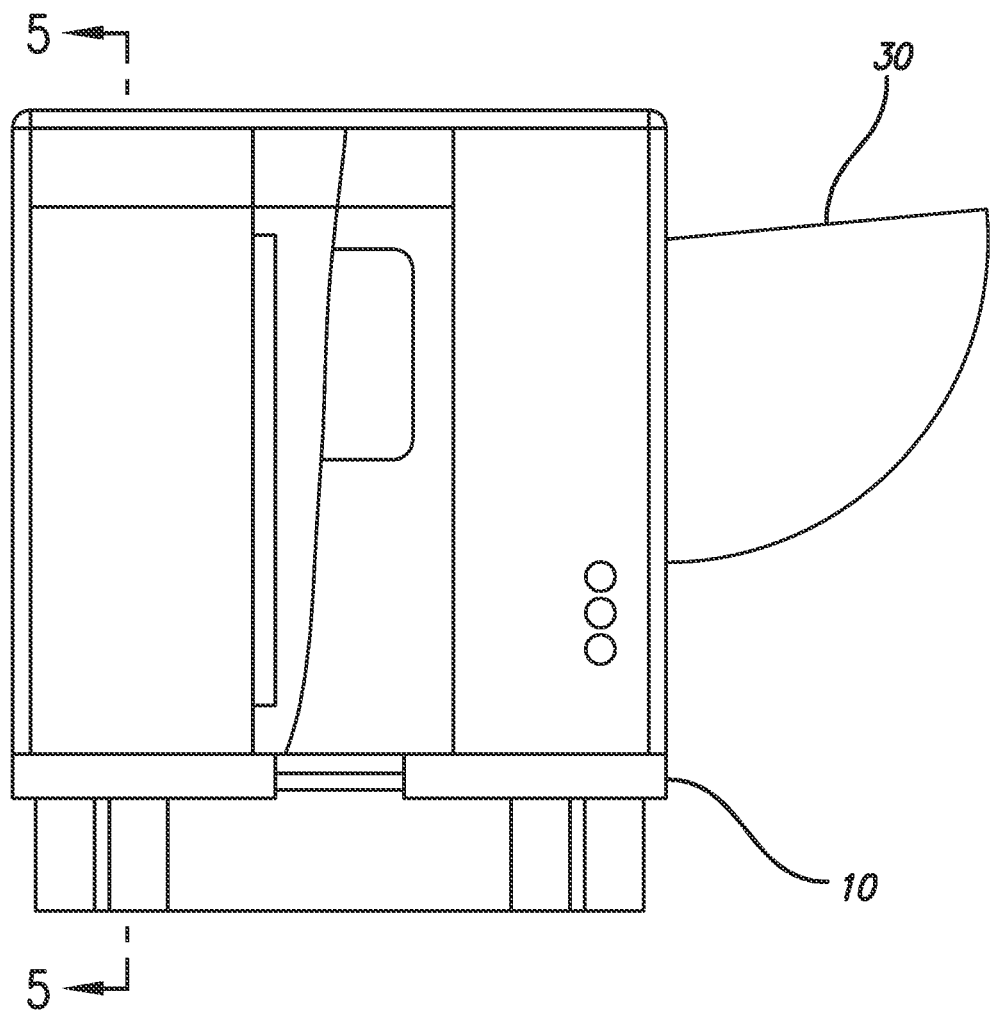
FIG. 3 is a rear view of a mobile vehicle/unit showing opened service windows.

Next, looking at FIG. 3, there is shown the rear of a typical mobile catering/vending/food service vehicle/unit 10 with the passenger or curb side service window 30 deployed to serve pedestrian or walk-up patrons only.

Figure 4:
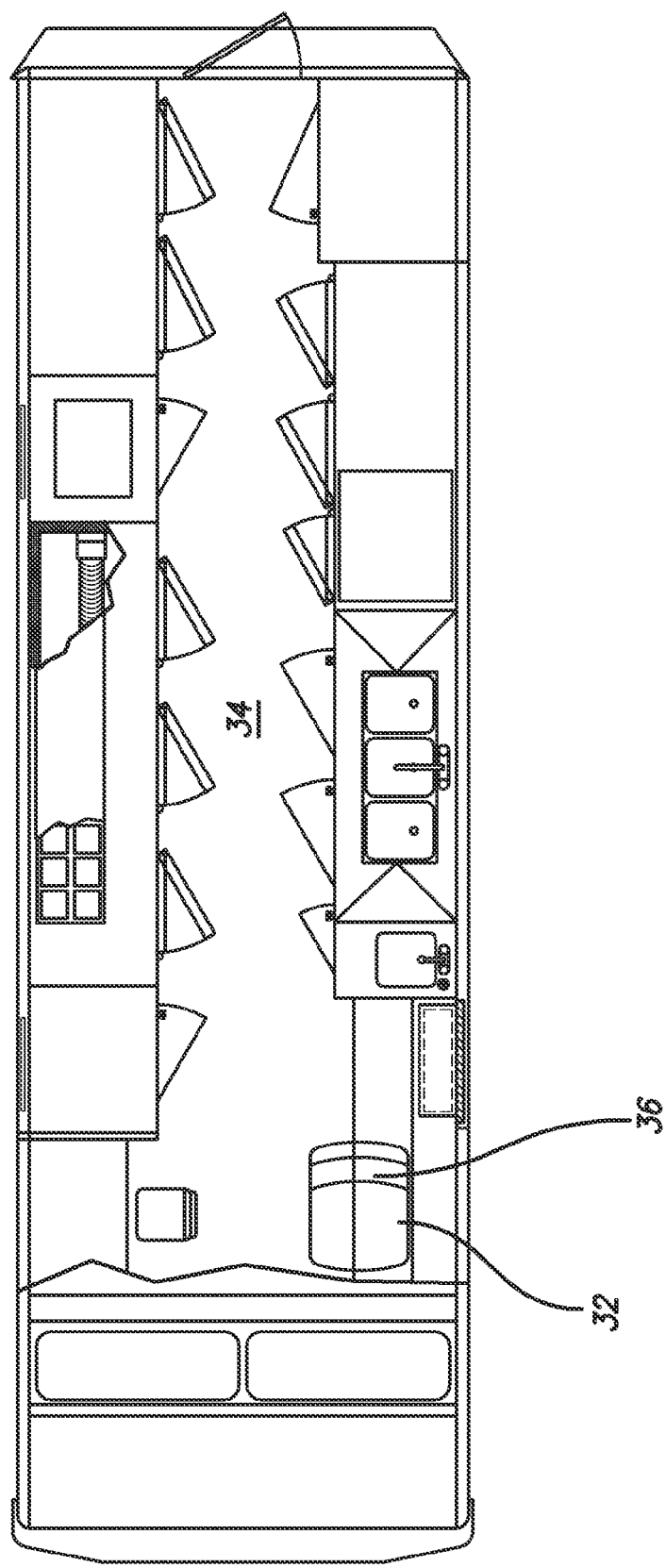
FIG. 4 is a top view of the unit of FIG. 1 taken along line 4-4 in the direction of the appended arrows.

Turning next to FIG. 4, there is shown a top view of the interior of the mobile vehicle/unit 10. With this view, the service platform 32 can be seen. Because the platform 32 is somewhat lower than the rest of the mobile vehicle/unit interior floor, a series of steps 36 are provided to gain access to the platform 32.

In alternative embodiments, where terrain clearance is a problem, the platform 32 can be retractable and can be latched to provide a uniform floor throughout the mobile vehicle/unit.

Figure 5:
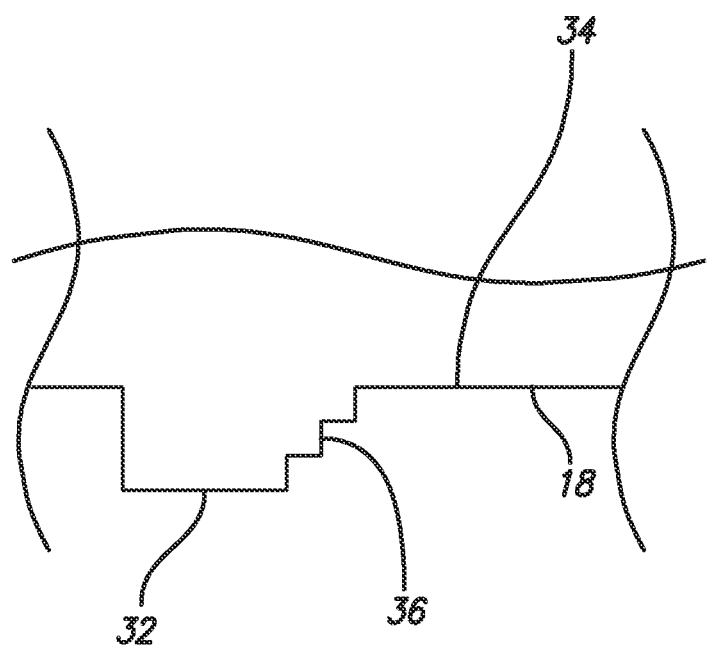
FIG. 5 is a partial, broken side view of the mobile vehicle/ unit taken along the line 5-5 of FIG. 3 in the direction of the appended arrows.

In FIG. 5, the platform 32 and steps 36 are more clearly shown. It is to be understood, however, that the platform 32 is intended to provide a server better access to customers in vehicles, but can serve pedestrians customers if in a location where pedestrian traffic on the driver's side of the vehicle is safe.

While the specification describes particular embodiments of the present invention, those of ordinary skill can devise variations of the present invention without departing from the inventive concept. However, the invention should only be limited by the scope of the claims appended below.

What is claimed as new is:

1. In a food service vehicle having a pedestrian service window and an interior floor, an alternative service facility comprising:
   a. an auxiliary service window below the level of the pedestrian service window;
   b. an auxiliary service platform adjacent said auxiliary service window and located below the interior floor; and
   c. access steps between the interior floor and said auxiliary service platform to enable access from the interior floor to said auxiliary service platform;

whereby said auxiliary service window is suited to serve patrons in vehicles adjacent the food service vehicle while the pedestrian service windows are better suited to serve pedestrian patrons.

2. The alternative service facility of claim 1, wherein the pedestrian service window is on the passenger side of the food service vehicle and said auxiliary service window is on the driver's side of the food service vehicle.

3. The alternative service facility of claim 1 wherein said auxiliary service window is on the passenger's side of the food service vehicle.

4. The alternative service facility of claim 1 wherein a sliding panel open and closes said auxiliary service window.

5. The alternative service facility of claim 1, wherein said auxiliary service platform is fixedly mounted in the interior floor.

6. The alternative service facility of claim 1, further including communication means attached to the vehicle whereby patrons can send orders to the interior of the service facility.

7. The alternative service facility of claim 6 whereby said communication means are attached to the rear of the service facility.

8. The alternative service facility of claim 6 whereby said communication means are attached to the driver's side of the service facility.

9. The alternative service facility of claim 1 wherein said auxiliary service window is on the side of the vehicle next adjacent where vehicular traffic would be encountered when in use.

* * * * *